United States Patent [19]

Pilborough

[11] Patent Number: 4,899,094
[45] Date of Patent: Feb. 6, 1990

[54] METHOD OF CALIBRATION FOR AN AUTOMATIC MACHINE TOOL

[75] Inventor: David I. Pilborough, Wotton-under-Edge, United Kingdom

[73] Assignee: Renishaw plc, England

[21] Appl. No.: 194,571

[22] PCT Filed: Sep. 16, 1987

[86] PCT No.: PCT/GB87/00644
§ 371 Date: May 9, 1988
§ 102(e) Date: May 9, 1988

[87] PCT Pub. No.: WO88/02139
PCT Pub. Date: Mar. 24, 1988

[30] Foreign Application Priority Data

Sep. 16, 1986 [GB] United Kingdom ................ 8622218

[51] Int. Cl.⁴ ............................................. G05B 19/24
[52] U.S. Cl. ...................................... 318/567; 318/572; 318/646; 318/632; 364/474.18; 364/474.37
[58] Field of Search ................... 318/632, 39, 560-563, 318/565-566, 567-572, 646; 82/14 D; 364/474, 474.02, 474.01, 474.17, 474.18, 474.34, 474.35, 474.57

[56] References Cited

U.S. PATENT DOCUMENTS

| | | | |
|---|---|---|---|
| 3,605,531 | 9/1971 | Izumi et al. | 318/572 |
| 3,628,002 | 12/1971 | Meese et al. | 318/572 |
| 3,641,849 | 2/1972 | Kinney | 318/572 |
| 3,727,493 | 4/1973 | Lahm | 318/572 |
| 4,153,998 | 5/1979 | McMurtry | 33/174 L |
| 4,195,250 | 3/1980 | Yamamoto | 318/572 |
| 4,281,385 | 7/1981 | Nakaso et al. | 364/474 |
| 4,382,215 | 5/1983 | Barlow et al. | 318/572 |
| 4,554,495 | 11/1985 | Davis | 318/572 |
| 4,562,392 | 12/1985 | Davis et al. | 318/572 |

FOREIGN PATENT DOCUMENTS

| | | |
|---|---|---|
| 2033610 | 4/1980 | United Kingdom . |
| 2069142 | 8/1981 | United Kingdom . |
| 21087154 | 4/1983 | United Kingdom . |

OTHER PUBLICATIONS

"Users Handbook Programs for Probes Component Inspection and Tool Datuming with Fanuc 6TB Control", Renishaw, pp. 25-35.

Primary Examiner—William M. Shoop, Jr.
Assistant Examiner—David Martin
Attorney, Agent, or Firm—Oliff & Berridge

[57] ABSTRACT

In an automatic lathe, a touch trigger probe (4) is calibrated (datumed) against an item (6) having a known reference dimension, instead of against the lathe chuck (2) or against a surface machined in a workpiece. The calibrated probe is then used to touch two diametrically opposed points of a feature (11) centered with respect to the axis of rotation of the chuck (2). From the mean of the co-ordinates of the two points touched, there is calculated an offset related to the difference between the assumed axis of rotation and the actual axis of rotation. This calibrates the machine to compensate for any drift between the actual axis of rotation and the machine's measurement origin.

6 Claims, 6 Drawing Sheets

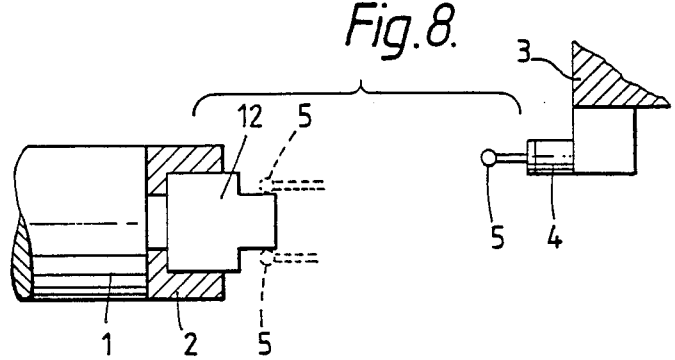
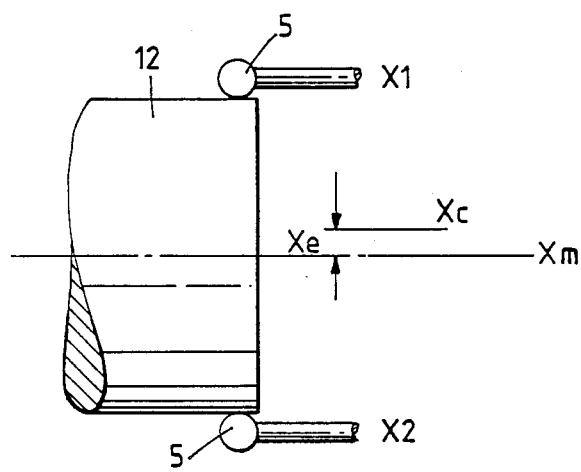
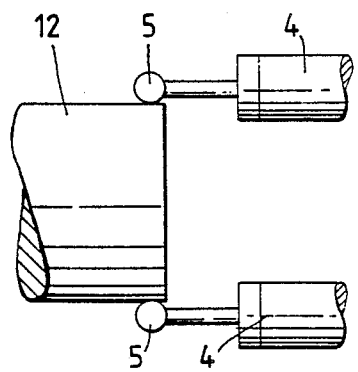
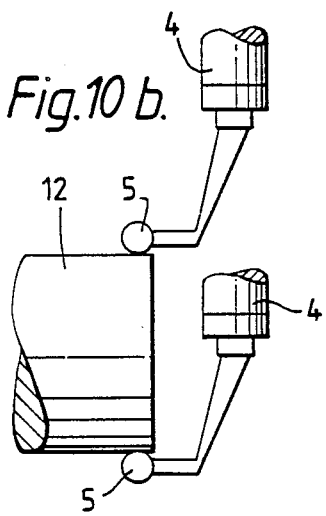

METHOD OF CALIBRATION FOR AN AUTOMATIC MACHINE TOOL

BACKGROUND OF THE INVENTION

The present invention relates to a method of calibration for an automatic machine tool, and more particularly for a lathe.

In the machine tool art, it is known to use a "touch trigger probe", of the kind described in U.S. Pat. No. 4,153,998, to trigger data processing means to produce an indication of x,y and z co-ordinates of a stylus of the probe in response to the stylus touching a surface. Such probes are moved relative to the workpiece in a similar manner to the cutting tools themselves (e.g. on tool-holding turret) and may be used both for checking the dimensions of a workpiece after machining by the machine tool and for controlling the machine tool during its machining of the workpiece.

The measurement indications of x,y and z co-ordinates are taken with respect to a measurement origin of the machine tool. Prior to use, the probe may be calibrated or "datumed" by causing it to trigger against one or more reference surfaces at fixed positions. This allows the calculation of "probe offsets" between the effective contact surfaces of the stylus and a nominal measurement position of the turret or other tool-holder in which the probe is mounted. These probe offsets are used to perform correction on subsequent measurements taken with the probe. Assuming the accuracy of the fixed reference position, such a correction takes account of the difference between the nominal measured position and the effective stylus contact surface.

We have found that a potential inaccuracy in probe datuming may occur in some machine tools if there is inaccuracy of positioning between the reference surface and the measurement origin. This may arise if there is deformation of the bed of the machine tool, causing a relative movement of the measurement origin. Such deformation may occur, for example, as a result of loading or thermal effects on the bed of the machine tool.

In the case of a machining center, such problems do not normally arise, at least in the x and y axes, for the following reason. The cutting tool spindle of a machining center is on the tool-holder, and hence its axis of rotation is local to the probe. The effects of machine bed deformation on the position of the measurement origin therefore have the same effect on both the measured position of the probe and on surfaces of the workpiece cut by the cutting tool. It follows that surfaces cut in the workpiece by the tool can be used as reference surfaces to calibrate the probe offset, since the effects of deformation then cancel each other out and do not give rise to a problem. Such techniques are described, for example, in U.S. Pat. No. 4,281,385 and British Patent Application No. GB 2,108,715 A.

In the case of lathes, it is known to calibrate the probe offset in the manner described above, using reference surfaces provided on the workpiece-holding chuck. See for example U.S. Pat. No. 4,382,215, and "Users Handbook—Programs for Probes, Component Inspection and Tool Datuming with Fanuc 6TB Control", Part 3, pages 25–35, published in 1984 by Renishaw Electrical Limited. However, we have found that this gives rise to the above-noted problem due to machine deformation. The problem cannot be removed simply by datuming the probe against surfaces machined in a workpiece by the use of the lathe, because the axis of rotation of the chuck is remote from the tool holder which holds the probe. Such datuming processes, we now realise, involve an assumption that the position of the axis of rotation of the chuck or workpiece can be accurately known relative to the measurement origin. In practice, this is not accurately known so if the machine is subject to deformation, and the inaccuracy is not cancelled out in the manner that it would be with a machining center, because the axis of rotation is not local to the probe.

SUMMARY OF THE INVENTION

According to the present invention, there is provided a method of calibration for an automatic machine tool having workpiece-holding means which is rotatable for machining a workpiece held therein, data processing means, and a trigger probe, which probe can be triggered against a point on the surface of the workpiece, in response to which the data processing means produces information representative of positional co-ordinates of the probe at the trigger point, the co-ordinates being with respect to a datum point which is based upon an assumed axis of rotation of the workpiece, the method comprising:
 (a) calibrating the probe, by triggering it against at least one point on an item having a known dimension and, using said dimension and a positional co-ordinate of the or each trigger point as indicated by the data processing means, computing a probe correction offset; and
 (b) calibrating the machine tool, by providing a feature centered with respect to the actual axis of rotation; triggering said probe against first and second diametrically opposite points on said feature with respect to the axis of rotation; and, on the basis of the mean of respective positional co-ordinates of the trigger points as indicated by the data processing means, corrected by the probe correction offset, computing an offset related to the difference, if any, between the actual axis of rotation and the assumed axis of rotation.

The feature centered with respect to the actual axis of rotation is preferably provided by machining the feature into a workpiece, since this ensures concentricity and obviates inaccuracies which can be caused by datuming on a surface of the chuck (which may become distorted owing to clamping loads).

BRIEF DESCRIPTION OF THE DRAWINGS

The present invention will now be described, by way of example, with reference to the accompanying drawings, in which:

FIGS. 8, 9, 10b and 11 are schematic diagrams for use in explaining the principle of a second aspect of the example of the invention;

DETAILED DESCRIPTION OF THE PREFERRED EMBODIMENTS

The following example of the invention first describes a method for calibrating a touch trigger probe 5 used with an automatic lathe, by deriving the effective (electronic) diameter of the spherical stylus of the probe. It then describes a method of using the thus-calibrated probe to calibrate for the actual center-line (axis of rotation) of the lathe.

Figure 1:
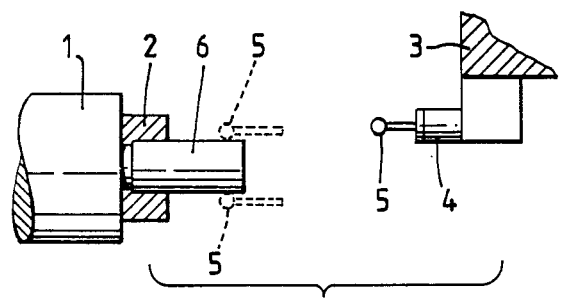
FIGS. 1–4 are schematic diagrams for use in explaining the principle of one aspect of an example of the invention.
Figure 2:
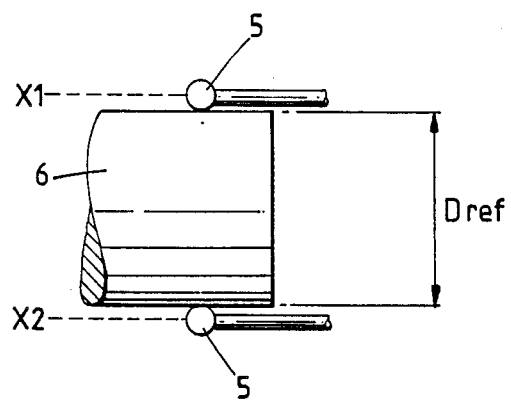

Referring first to FIG. 1, reference numeral 1 denotes the chuck of an automatic lathe having chuck jaws 2. Reference numeral 3 denotes a tool turret of the lathe, carrying a touch trigger probe 4 having a spherical stylus 5. Reference numeral 6 denotes an item for example a reference bar or cylinder, held in the jaws 2 as concentrically as possible and of known diameter Dref. The stylus 5 of the probe 4 is caused to touch the item 6 at two diametrically opposite points as shown by broken lines in FIG. 1. Referring to FIG. 2, if X1 and X2 are the x-co-ordinates as measured by data processing means coupled with the probe for the two points of contact, then the effective (electronic) diameter Db of the stylus (which is smaller than the actual, physical diameter of the stylus), is given by:

$$Db = |Dref - (X1 - X2)|$$

The data processing means is programmed to effect a calculation on the basis of the above equation to produce an indication of the effective (electronic) diameter of the stylus 5 for use in correcting co-ordinate measurements on the basis of Db.

If the co-ordinate measuring system comprising the data processing means and the probe has been calibrated with respect to the center-line (axis of rotation) of the lathe, then a single touch method at a point whose x-co-ordinate is measured to be X1 can be used to obtain the effective stylus radius (Rb) by the equation:

$$Rb = Rref - X1,$$

where Rref is the known radius of the item 6.

Figure 3:
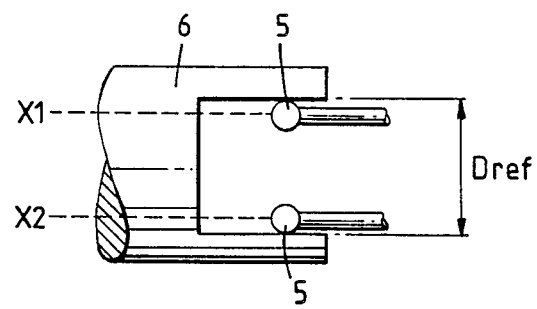

The computation of the effective stylus diameter (or radius) could be carried out with respect to an internal bore in an item 6 held in the chuck jaws 2, the bore being of known diameter Dref—see FIG. 3. Again:

$$Db = |Dref - (X1 - X2)| \text{ or}$$

$$Rb = Rref - X1$$

if the system has been calibrated with respect to the center-line of the lathe.

Figure 4:
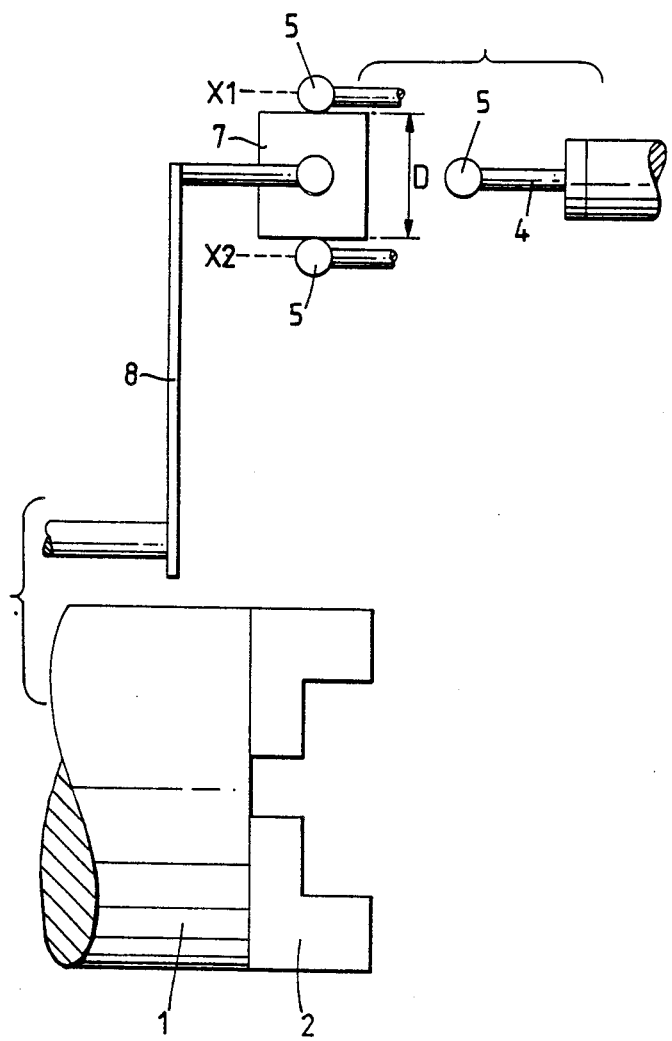

As an alternative (due to machine constraints) to calibration for stylus diameter (or radius) with respect to an item 6 held in the jaws 2, an item for calibration purposes may be used which is held by a remotely mounted calibration arm—see FIG. 4. In FIG. 4, reference numeral 7 denotes an item of known dimensions carried by a fixed or automatically re-positionable arm 8. For greatest accuracy, preferably the arm 8 can be swung so that the item 7 is in the vicinity of the center line of the lathe during the calibration. It is swung out of the way afterwards. Item 7 could, as shown, be a cube of known thickness D, the effective diameter Db of the stylus 5 being given by:

$$Db = D - (X1 31 X2)$$

Figure 5:
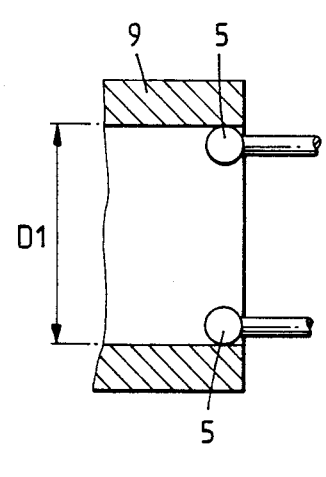
FIGS. 5, 6 and 7 are schematic diagrams for use in explaining how measurements are made after a calibration for a stylus dimension has been accomplished.
Figure 6:
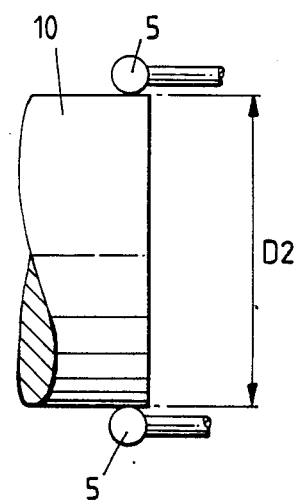
Figure 7:
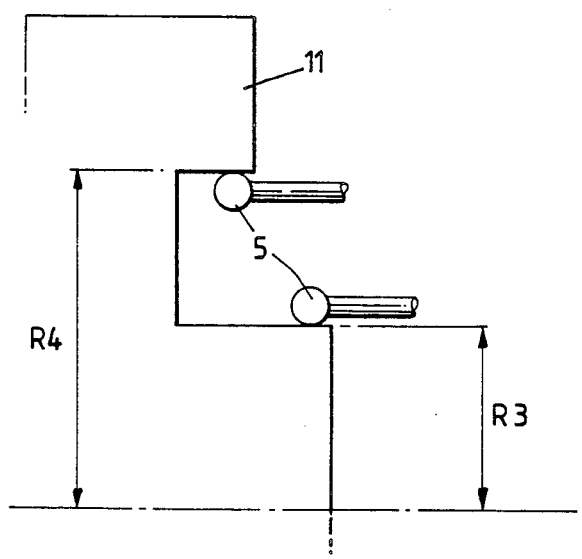

After the system has been calibrated for the effective diameter or radius of the stylus 5, then the value of the latter may be taken into account when using the probe 4 to measure dimensions. Referring to FIG. 5, if the internal diameter D1 of a bore in a workpiece 9 is to be measured by touching the stylus 5 at two diametrically opposite points of the bore, then D1 is found by adding the diameter Db of the stylus 5 to the diameter of the bore as actually measured by the system comprising the probe 4 and the data processing means. Referring to FIG. 6, if the external diameter D2 of a workpiece 10 is to be measured by touching the stylus 5 at two diametrically opposite points, then the diameter D2 is found by subtracting the diameter Db from the diameter as actually measured by the system comprising the data processing means and the probe 4. Where diameter measurement is not possible directly by virtue of machine constraints, a single touch method may be used provided that the probe center-line with respect to the lathe center-line has recently been upgraded. For example, referring to FIG. 7, the radius R3 of a workpiece 11 is found from the difference between the radius as actually measured by the system comprising the data processing means and the probe 4 and the effective radius of the stylus 5; and the radius R4 of the workpiece 11 is found by adding the radius as actually measured by the system comprising the data processing means and the probe 4 and the effective radius of the stylus 5.

Incidentally, if the item with respect to which the above computation to determine the effective diameter (or radius) of the stylus 5 does not have its axis parallel with the center-line (axis of rotation) of the machine tool, then this needs to be compensated for in computation of the effective diameter by ascertaining the angle between the two axes and applying the cosine principle to (X1−X2) or X1.

There will now be described a method of calibrating for the actual center-line of the lathe. This might differ from the assumed center-line on the basis of which the system comprising the data processing means and the probe 4 provides co-ordinate information, for example due to thermal or other effects. (In practice, the co-ordinates are taken from an arbitrary measurement origin of the system, which is normally assumed to be fixed with respect to the center-line; an assumption which might be invalid at any given time because of the thermal or other effects. Calibration as described below compensates for this).

First, referring to FIG. 8, a workpiece 12 is turned on the lathe using a tool to a diameter suitable for the stylus 5 on the probe 4 to contact diametrically opposite points, as shown by the broken lines in FIG. 8.

Referring to FIG. 9, if:
X1 is the x-co-ordinate of one point of contact as measured by probe 4 and the data processing means;
X2 is the x-co-ordinate of the other point of contact as measured by the probe 4 and the data processing means; and
Xc is the assumed x-co-ordinate of the center-line of the lathe,
then the error Xe in the system's assumption of the x-co-ordinate of the center-line of the lathe is given by:

$$Xe = Xc - Xm$$

where $$Xm = (X1 + X2)/2,$$

namely the mean of X1 and X2.

Incidentally, the probe can be arranged so that its principal axis is parallel or normal to the rotational axis (center-line) of the lathe—see FIGS. 10a and 10b. This applies also to the earlier described method or calibration for stylus diameter of radius.

Figure 11:
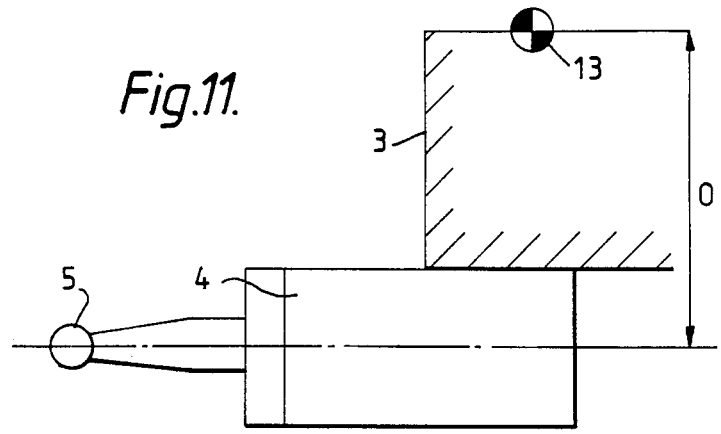

Once the error Xe in the assumed center-line has been computed, this can be used by the data processing means to directly modify the offset with respect to a datum point with respect to which position is defined, or by using the error value to correct co-ordinate values derived using a probe. In FIG. 11, reference numeral 13 denotes the datum point and O is the x-axis offset to the probe center-line.

Figure 12:
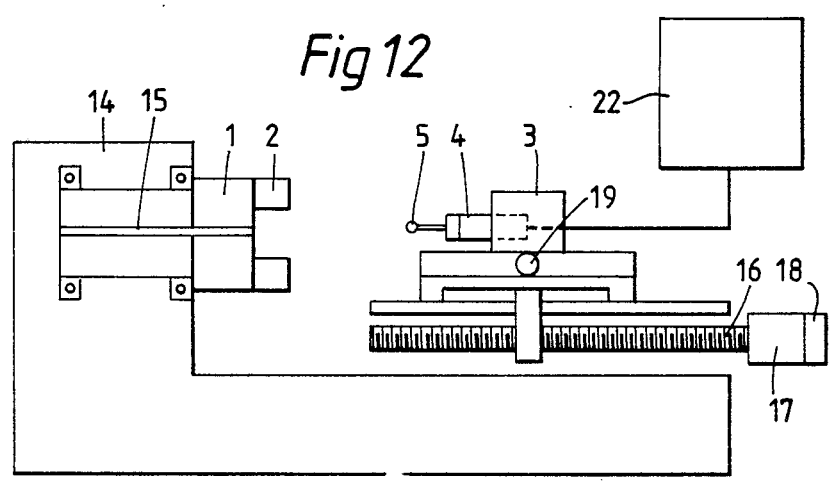
FIGS. 12 and 13 are a schematic of an automatic lathe.
Figure 13:
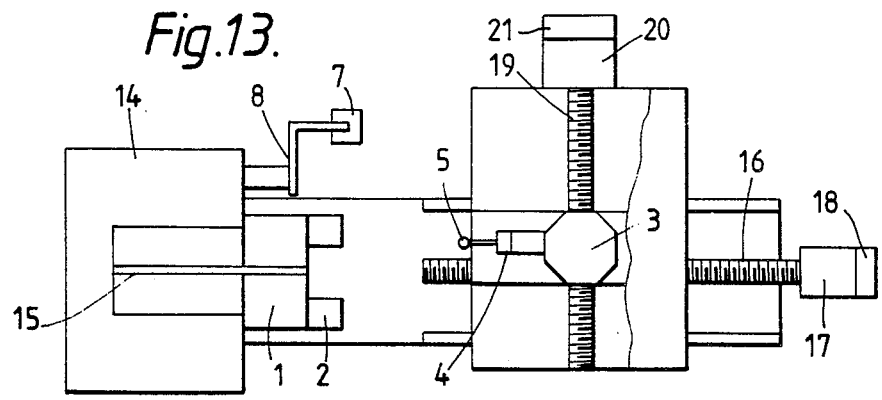

FIGS. 12 and 13 are schematic side and plan views of an automatic lathe with which the present invention may be used. Reference numeral 14 denotes a headstock of the lathe; reference numeral 15 denotes the lathe spindle; reference numeral 16 denotes a z-axis lead screw; reference numeral 17 denotes a z-axis drive; reference numeral 18 denotes a z-axis encoder; reference numeral 19 denotes an x-axis lead screw; reference numeral 20 denotes an x-axis drive; reference numeral 21 denotes an x-axis encoder; and reference numeral 22 denotes a cabinet within which is a computerised numerical control unit data processing means. As well as controlling the operation of the lathe, the data processing means is also programmed to store co-ordinate positional information and perform calculations on the basis of the above for determining the effective diameter or radius of the stylus 5 and the error, if any, between the assumed center-line of the lathe and the actual center-line.

Incidentally, the item 7 could also itself operate as a touch trigger probe, needing a greater contact force to cause a triggering reaction than the probe 4, and be used, for example, in setting up tools carried by the lathe.

Figure 14A:
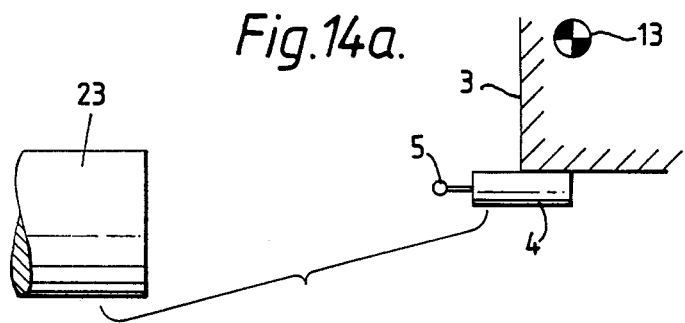
FIGS. 14a, 14b and 15 are schematic diagrams for use in explaining an extension of the second aspect of the example of the invention.
Figure 14B:
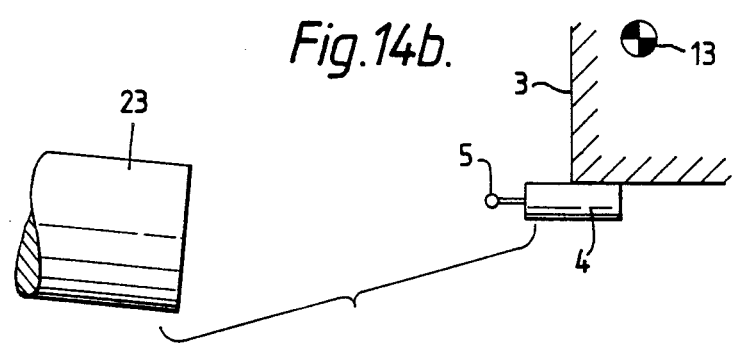
Figure 15:
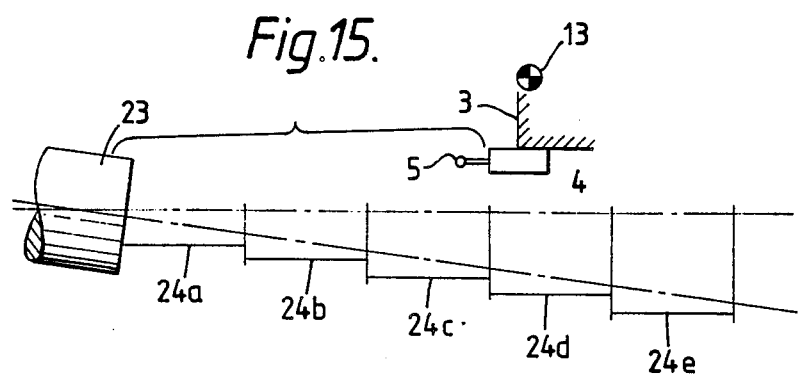

There will now be described an extension of the present invention whereby calibration is repetitively carried out during operation of the lathe to calibrate for a shift in the actual center-line of the lathe. Referring to FIG. 14a, this shows the condition of a workpiece 23 with the actual center-line in a correct, assumed position, FIG. 14b showing the position of workpiece 23 in a second condition in which the actual center-line has shifted. In the first condition, the probe 4 will be referred to the correct center-line (axis of rotation) from its datum point and a tool offset, or a separate data store can be modified to store the probe offset from the datum point to the center-line of the probe 4. In the second condition, the lathe spindle has moved for an unspecified reason by an unknown amount. The specification of the datum position with respect to the actual center-line of the lathe is no longer valid. A re-calibration for the actual center-line of the lathe then needs to be carried out on the basis of the foregoing. Such re-calibration may be carried out repetitively during a prolonged sequence of operations to continuously re-calibrate for a shift in the actual center-line of the lathe. It will be noed that only the second half of the procedure described above (calibration for the center line) needs to be repeated; the probe itself will not normally need recalibration since it has been calibrated against the known dimension of the reference item 6 or 7. It is also to be noted that a subsequent calibration of the lathe will be for a specific position thereon and, if the shift of the center-line results in an angular error between the assumed center-line and the actual center-line, then re-calibration may be repeated for different zones—see FIG. 15 in which, on the basis of a knowledge of the angular error and the distance offset in the z direction at the position of the probe 4 at re-calibration, the errors at zones 24a, 24b, 24c, 24d . . . may be calculated by the data processing means. The errors due to the angular inclination may be made available for incorporation into an interactive control system where the software of the data processing means adjusts readings of positional measurement. Alternatively, the data may be fed out to an external computer capable of re-adjusting a lathe control system without the need for compensations or modifications of positional data.

Incidentally, as an alternative to using a particular item 12, any convenient diameter on an actual workpiece being operated on may be used for calibration for a shift in lathe center-line, as the process is size independent; or one may provide a nominal diameter which may be destroyed later either on the workpiece itself or on a fixture on the lathe.

I claim:

1. A method of calibration for an automatic machine tool having workpiece-holding means which is rotatable about an axis for machining a workpiece held therein, data processing means, and a trigger probe, which probe can be triggered against a point on the surface of the workpiece, in response to which the data processing means produces information representative of positional co-ordinates of the probe at the trigger point, the co-ordinates being with respect to a datum point which is based upon an assumed position of the axis of rotation of the workpiece holding means, the method comprising:

(a) calibrating the probe, by triggering it against at least one point on an item having a known dimension and, using said dimension and a positional co-ordinate of the or each trigger point as indicated by the data processing means, computing a probe correction ofset; and (b) calibrating the machine tool, by providing a physical feature having an axis of rotation centered with respect to the actual position of the axis of rotation of the workpiece holding means; triggering said probe against first and second points on said feature; and, on the basis of the mean of respective positional co-ordinates of the trigger points as indicated by the data processing means, corrected by the probe correction offset, computing an offset Xe related to the difference, if any, between the actual position and the assumed position of the axis of rotation of the workpiece holding means.

2. A method according to claim 1, wherein the probe is calibrated by triggering it against two opposite points of the item having a known dimension, and calculating the probe correction offset Db as:

$$Db = |Dref - (X1 - X2)|$$

where Dref is said known dimension, and X1 and X2 are the co-ordinates of the trigger points as measured by the data processing means.

3. A method according to claim 1, wherein the feature centered with respect to the actual position of the axis of rotation is provided by machining the feature into a workpiece.

4. A method according to claim 1, wherein said offset Xe relates to the difference between the actual position of the axis of rotation and the assumed position of the axis of rotation and is given by $$Xe = Xc - Xm$$

where Xc is the assumed positional co-ordinate of the axis of rotation, and Xm is said mean of the positional co-ordinates of the trigger points of said feature centered on the actual position of the axis of rotation.

5. A method according to claim 1, in which step (b) is repeated at subsequent times to re-calibrate the machine tool.

6. A method according to claim 1, wherein step (b) is repeated for different working zones of the machine tool.

* * * * *